(12) United States Patent
Strehle et al.

(10) Patent No.: US 9,227,606 B2
(45) Date of Patent: Jan. 5, 2016

(54) METHOD FOR OPERATING A BRAKING SYSTEM AND A CORRESPONDING CONTROL UNIT

(75) Inventors: Alfred Strehle, Fellbach (DE); Stefan Diehle, Korntal-Muenchingen (DE); Achim Eisele, Hessigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 546 days.

(21) Appl. No.: 13/510,776

(22) PCT Filed: Nov. 12, 2010

(86) PCT No.: PCT/EP2010/067357
§ 371 (c)(1),
(2), (4) Date: Aug. 1, 2012

(87) PCT Pub. No.: WO2011/061124
PCT Pub. Date: May 26, 2011

(65) Prior Publication Data
US 2012/0290183 A1   Nov. 15, 2012

(30) Foreign Application Priority Data

Nov. 20, 2009 (DE) .......................... 10 2009 046 942

(51) Int. Cl.
*G06F 7/70* (2006.01)
*G06F 19/00* (2011.01)
(Continued)

(52) U.S. Cl.
CPC ......... *B60T 8/17636* (2013.01); *B60T 8/17555* (2013.01); *B60T 8/17616* (2013.01); *B60T 8/1761* (2013.01); *B60T 8/1764* (2013.01)

(58) Field of Classification Search
CPC .............. B60T 8/1761; B60T 8/17616; B60T 8/17636; B60T 8/5037; B60T 8/17555
USPC ................ 701/70, 71, 83, 90, 91; 303/14, 15, 303/9.67, 148, 149, 157, 187, 195
See application file for complete search history.

(56) References Cited

U.S. PATENT DOCUMENTS 4,900,099 A * 2/1990 Braschel ........................ 303/156
5,251,970 A * 10/1993 Braschel et al. .............. 303/185

(Continued)

FOREIGN PATENT DOCUMENTS

| CN | 1466528 | 1/2004 |
| CN | 1519149 | 8/2004 |

(Continued)

OTHER PUBLICATIONS

Machine_translation for reference DE19546363.*

*Primary Examiner* — Khoi Tran
*Assistant Examiner* — Rachid Bendidi
(74) *Attorney, Agent, or Firm* — Kenyon & Kenyon LLP

(57) ABSTRACT

A method for operating a braking system of a vehicle having at least one brake-able wheel, a braking force variable, which represents a braking force, of a braking device associated with the wheel being increased during a braking operation until a locking tendency of the wheel is recognized, and then reduced to a certain value. It is provided that the braking force variable is subsequently set to a setpoint braking force variable, which corresponds to a selectable portion of the braking force variable present at the recognition of the locking tendency, for a certain time period. Also described is a control unit for implementing the method.

12 Claims, 1 Drawing Sheet

(51) Int. Cl.
*G06G 7/00* (2006.01)
*G06G 7/76* (2006.01)
*B60T 8/1763* (2006.01)
*B60T 8/1755* (2006.01)
*B60T 8/1761* (2006.01)
*B60T 8/1764* (2006.01)

(56) References Cited

U.S. PATENT DOCUMENTS

| | | | |
|---|---|---|---|
| 5,707,120 | A | 1/1998 | Monzaki et al. |
| 5,992,952 | A * | 11/1999 | Kubota ............ 303/191 |
| 6,450,586 | B1 * | 9/2002 | Nagano ............ 303/2 |
| 6,772,058 | B2 * | 8/2004 | Miyazaki ............ 701/71 |
| 2006/0212206 | A1 * | 9/2006 | Miyazaki ............ 701/71 |
| 2007/0029875 | A1 * | 2/2007 | Kurosaki et al. ............ 303/187 |
| 2007/0114839 | A1 * | 5/2007 | Ito et al. ............ 303/15 |
| 2008/0255744 | A1 * | 10/2008 | Yasui et al. ............ 701/70 |

FOREIGN PATENT DOCUMENTS

| | | |
|---|---|---|
| DE | 3301948 | 7/1984 |
| DE | 195 11 152 | 10/1996 |
| DE | 196 43 179 | 4/1997 |
| DE | 195 46 363 | 6/1997 |
| DE | 19546363 | 6/1997 |
| DE | 197 52 061 | 5/1999 |
| DE | 19546363 B4 * | 4/2005 |
| EP | 0 330 064 | 8/1989 |
| EP | 1 982 886 | 10/2008 |
| FR | 2 539 687 | 7/1984 |
| GB | 2 135 413 | 8/1984 |

* cited by examiner

METHOD FOR OPERATING A BRAKING SYSTEM AND A CORRESPONDING CONTROL UNIT

THE FIELD OF THE INVENTION

The present invention relates to a method for operating a braking system of a vehicle having at least one brake-able wheel, a braking force variable, which represents a braking force, of a braking device associated with a wheel being increased during a braking operation until a locking tendency of the wheel is recognized, and then reduced again to a certain value. The present invention furthermore relates to a corresponding control unit.

BACKGROUND INFORMATION

Methods of the type mentioned at the outset are believed to be understood from the related art. These methods are supposed to prevent the wheel from locking on a road surface beneath the vehicle in such a way that the wheel slip exceeds a certain value starting from which the locking tendency occurs. In this way, it should be prevented that the wheel gets too far into the sliding friction range, on the one hand, and the vehicle should remain controllable, on the other hand. The latter is not the case if the locking wheel is used to steer the vehicle, since no lateral cornering forces may be transferred to the road surface in this case. For this reason, during the braking operation of the vehicle, which is induced by a driver of the vehicle or by a driver assistance system, for example, the braking force variable set at the braking device should be increased until the locking tendency is recognized.

The locking tendency is present when the wheel slip exceeds a certain limiting value. For this purpose, the wheel may be assigned an arrangement for determining its rotational speed, which may be compared to a reference velocity of the vehicle or to a reference rotational speed. Upon recognizing the locking tendency, the braking force variable is reduced to the certain or predetermined value. This value equals zero, for example, or corresponds to a braking force variable at which the locking tendency is no longer present or is no longer detected. The braking system of the vehicle is thus an ABS braking system. It usually has an ABS control unit which may be designed as a controller. The braking force variable may be, for example, directly the set braking force or, alternatively, a brake pressure, a brake slip or the like.

This controller may, for example, work according to the optimizer principle. This controller is also often referred to as an instability controller. It sets the braking force variable acting on the wheel in such a way that the previously described succession of increasing the braking force variable until the locking tendency is recognized and reducing it to a certain value is implemented. The maximum of a μ-slip curve is cyclically surpassed and the braking force variable of the wheel thus approaches a maximum. The μ-slip curve is a curve which describes the behavior of the friction coefficient μ plotted against the wheel slip. The μ-slip curve therefore depends on the wheel and on the road surface beneath the vehicle, and on the surrounding conditions (temperature, humidity and the like).

Controllers for a rear axle of the vehicle, which work according to the optimizer principle, are often additionally superimposed with a select-low control, or a pressure difference control, in order to keep the side-force reserves for a lateral cornering of the vehicle (driving stability) in an admissible range. In the select-low control, the wheel having the greatest locking tendency determines a common braking force variable of the wheels associated with the rear axle. Each of the wheels thus has arrangement(s) for determining the rotational speed and the braking device, the braking force variable set at this braking device being the same for all wheels of the rear axle.

Controllers are also understood to work according to the slip control principle, i.e., they set the wheel slip to a certain value. Such a controller requires a very precise reference speed which, however, may only be determined with the aid of additional sensors which are adequately precise. These additional sensors must be provided in addition to the arrangement for determining the rotational speed of the wheel. The disadvantages of the procedures described above are that either additional sensors are needed, or the traveling comfort for the driver of the vehicle is reduced due to strong cyclic difference pressures or very strong oscillations of the braking force variable.

SUMMARY OF THE INVENTION

The method having the features described herein is believed to have the advantage over the related art that no additional sensors for determining the reference speed are required, i.e., the traveling comfort for the occupants of the vehicle is increased. This may be achieved according to the exemplary embodiments and/or exemplary methods of the present invention in that the braking force variable is subsequently set to a setpoint braking force variable, which corresponds to a selectable portion of the braking force variable present at the recognition of the locking tendency, for a certain time period. After the braking force variable has been reduced to the certain value, it should thus be set to the setpoint braking force variable. For this purpose, the braking force variable present at the recognition of the locking tendency is stored. The setpoint braking force variable corresponds to a selectable portion of this braking force variable. The setpoint braking force variable is set at the braking device for the certain time period in a controlling and/or regulating manner.

This means that the wheel is initially put into an instable range, in which the locking tendency occurs, by increasing the braking force variable. The locking tendency may, for example, be recognized based on a delay and/or a wheel slip. Subsequently, the braking force variable is reduced to the certain value at which the locking tendency is reduced or no longer present. In the controllers known from the related art which work according to the optimizer principle this is carried out for each brake-able wheel of the vehicle. In this case, the braking force variable is cyclically increased until a strong wheel response indicates the increasing locking tendency. Subsequently, the braking force variable is rapidly reduced, putting the wheel back into a stable range of the μ-slip curve, in which the locking tendency is reduced or no longer present. Subsequently, the next control cycle is initiated, i.e., the braking force variable is increased again until the locking tendency is recognized.

Here, it is common to carry out the setting of the braking force variable not too infrequently and not concurrently, i.e., alternatingly. If, however, the setting is carried out alternatingly for the wheels of one axle of the vehicle, strong cyclic braking force variable differences between the wheels of the axle (alternating phase) occur at a road surface beneath the vehicle, which has a certain μ slip characteristic (a very pointed shape of the μ-slip curve maximum). In a concurrent phase, however, strong oscillations of the braking force variable occur. Both phases alike are perceived as uncomfortable by the driver of the vehicle and the occupants of the vehicle.

With the aid of the method according to the present invention, such oscillations in the braking force variable or the braking force variable differences may be reduced, the braking power of the wheel or the vehicle being possible at the same time and it being possible to reliably determine the reference velocity of the vehicle. The cycle for setting the braking force variable of the wheel is supplemented with the step in which the setpoint braking force variable is set at the braking device for the certain time period.

This means that the braking force variable is initially increased until the locking tendency is recognized and then reduced to the certain value and the braking force variable is subsequently set to the setpoint braking force variable. Subsequently, a new cycle starts, i.e., the braking force variable is again increased until the locking tendency is recognized. In this way, an "oscillating" change of the braking force variable is at least interrupted by holding the braking force variable for the certain time period so that no oscillations of the wheel or the axle are excited. By holding the braking force variable at the setpoint braking force variable the braking power does not decrease. To the contrary, the mean braking power of the vehicle is even increased in the normal case. Likewise, the determination of the reference speed may be simplified by the controlled and/or regulated holding phase at the setpoint braking force variable.

One refinement of the present invention provides that the vehicle has at least two brake-able wheels, in particular provided on a common axle. The method is particularly advantageously applicable when multiple wheels are present. These wheels may, for example, be present on the common axle. In such a vehicle design, the braking forces, which are applied with the aid of the braking device to the brake-able wheels, may be synchronized with one another so that the traveling comfort of the vehicle is further increased.

One refinement of the present invention provides that the increase and reduction of the braking force variable is carried out for one of the wheels, while the braking force variable is set to the setpoint braking force variable for another one of the wheels. The increase and reduction of the braking force variable is associated with a calibration phase, and the holding of the braking force variable at the setpoint braking force variable is associated with a holding phase. It is now provided that the calibration phase runs for the one wheel, while the other wheel is in the holding phase. During the holding phase, the wheel, to which the setpoint braking force variable is applied, is kept in the stable range of the μ-slip curve, the setpoint braking force variable may essentially correspond to a maximally possible braking force variable for which this is barely the case. At the same time, the calibration phase is carried out for the one wheel, i.e., the setpoint braking force variable is ascertained which is to be set at the one wheel in the subsequent holding phase.

As soon as the calibration phase for the one wheel is completed, the holding phase is carried out for this wheel, while the calibration phase starts for the other wheel. Oscillations of the braking force variable between the wheels are thus reduced, thus significantly increasing the traveling comfort of the vehicle. Due to the holding phase, the frequency is reduced at which the braking force variable is set. This results in a reduction of the volumetric flow-rate of the brake fluid since it is usually discharged under pressure reduction from the braking device into a reservoir when the braking force variable is reduced. The brake fluid must subsequently be delivered by a pump (feedback pump) from the reservoir back into a main brake cylinder of the braking system. Reducing the frequency or reducing the volumetric flow-rate results in a smaller movement of the brake pedal (increased pedal comfort). Furthermore, the pump speed with which the brake fluid is delivered from the reservoir to the main brake cylinder may be reduced (less noise production) or even a smaller and thus less expensive pump, in particular pump motor, may be provided.

One refinement of the present invention provides that the increase and reduction of the braking force variable for the one wheel starts with a time delay or directly after the setpoint braking force variable has been set for the other wheel. If the other wheel is in the holding phase, the calibration phase for the one wheel may be started directly after the beginning of the holding phase. However, it may also be provided that a waiting time period passes first and thus the calibration phase is started with a time delay after the beginning of the holding phase.

One refinement of the present invention provides that the increase and reduction of the braking force variable is carried out for the one wheel even if the certain time period and/or a maximum time period is/are exceeded and/or the locking tendency is detected and/or an appropriate request exists. The calibration phase, including an increase and a reduction of the braking force variable, for the one wheel should be carried out in some cases even if the other wheel is not in the holding phase, i.e., the braking force is not (yet) set to the setpoint braking force variable. This is in particular the case if the certain time period of the holding phase for the wheel is exceeded. It may also be provided as an alternative that, if the certain time period has elapsed but the other wheel is not yet in the holding phase, the certain time period is extended accordingly until the setpoint braking force variable is set for the other wheel.

This is, however, provided only until a maximum time period elapses. If this maximum time period is exceeded, the calibration phase for the one wheel is started. This may also be provided if the locking tendency of the one wheel is recognized during its holding phase. This means that the road surface beneath the vehicle has, for example, changed in such a way that the wheel locks or has at least a locking tendency while the setpoint braking force variable is set. If this is determined, the calibration phase is initiated immediately, i.e., the braking force variable is increased until the locking tendency is recognized and subsequently reduced to the certain value. It may, however, also be provided that the increase in the braking force variable is dispensed with in this case since the locking tendency has already been determined during the holding phase.

Alternatively or additionally, the calibration phase may be initiated for the one wheel even if the request exists. The request may, for example, signalize a special state and/or may have been initiated by a driver assistance device, such as an ESP or TCS system. The request may thus exist when the driver assistance device determines that the vehicle is instable so that it is necessary to increase the frequency at which the braking force variable is set at the wheel. In this case, the holding phase is aborted and the calibration phase for the one wheel is carried out.

One refinement of the present invention provides that the locking tendency is determined based on a reference rotational speed which corresponds to the average rotational speed of the wheel and/or of at least one other wheel. The wheel slip is deduced with the aid of the reference rotational speed. The reference rotational speed corresponds to a reference velocity of the vehicle, for example. It is determined from the average rotational speed of at least one wheel of the vehicle; the brake-able wheel or other wheels of the vehicle may be taken into account.

One refinement of the present invention provides that the portion is selected in the range of 10% to 100%, which may be in the range of 25% to 75%, particularly may be 50%. The portion does not have to be selected as a fixed value, but may be adapted according to certain influencing variables. The portion determines the variable of the setpoint braking force variable during the calibration phase of the wheel on the basis of the braking force variable present at the recognition of the locking tendency. A portion of 100% may be selected when no locking tendency of the wheel is recognized during the increase of the braking force variable up to a maximum braking force variable of the braking device. If, however, the locking tendency is recognized, it is reasonable to select the portion to be smaller than 100% in order to prevent the locking tendency of the wheel from occurring during the subsequent setting of the braking force variable to the setpoint braking force variable, i.e., during the holding phase. Typically, the portion is selected to be 50%. A variability of the portion is, however, also provided, the portion being selected as a function of influencing variables such as temperature, vehicle velocity, locking tendency of the other wheels of the vehicle and the like.

One refinement of the present invention provides that the portion is increased when it is determined during an increase of the braking force variable following the setting of the setpoint braking force variable that the distance between the setpoint braking force variable and the braking force variable, at which the locking tendency is determined, exceeds a maximum value and/or that the portion is reduced when the distance is below a minimum value. The portion should thus be changed starting from a preceding value of the portion. During the holding phase, the braking force variable is set to the setpoint braking force variable. Subsequently, the calibration phase for the wheel is carried out, i.e., the braking force variable is increased until the locking tendency is determined. If it is determined during the increase of the braking force variable that the distance or the difference between the setpoint braking force variable and the braking force variable, at which the locking tendency occurs, is greater than a maximum value, the portion is increased by a certain value. The value is determined in such a way that the setpoint braking force variable for the next holding phase is below the braking force variable at which the locking tendency is determined during the calibration phase. Alternatively or additionally, the portion may be reduced when the distance or the difference is below a minimum value. For this purpose, the portion is reduced by a determined value, for example. The portion may likewise be reduced when the locking tendency of the wheel has already been determined during the holding phase.

One refinement of the present invention provides that the time period is selected according to a desired lateral cornering force of the vehicle and/or is selected to be smaller in the case of a reduced locking tendency. By extending the time period, the lateral cornering force of the vehicle may be increased. It may thus be reasonable to extend the time period during certain driving states of the vehicle, e.g., when negotiating curves with the vehicle. The setting or selecting of the time period may be provided starting from a driver assistance device. As soon as it determines that the increase in the lateral cornering force is desired or necessary, it may adapt the time period accordingly. It is likewise possible to increase the braking power of the wheel or the vehicle by selecting the time period to be smaller if a reduced locking tendency of the wheel is determined. Thus, the braking force variable of the wheel may be quickly adapted to the increasing friction values between the road surface and the wheel. The time period may certainly also be selected as a function of a locking tendency of other wheels of the motor vehicle.

The exemplary embodiments and/or exemplary methods of the present invention further relate to a control unit of a braking system of a vehicle, in particular for implementing the method according to the preceding explanation, the braking system having at least one brake-able wheel, and the control unit being provided to increase a braking force variable, which represents a braking force, of a braking device associated with the wheel during a braking operation until a locking tendency of the wheel is recognized, and to then reduce it to a certain value. For this purpose, the control unit is also provided to subsequently set the braking force variable to a setpoint braking force variable, which corresponds to a selectable portion of the braking force variable present at the recognition of the locking tendency, for a certain time period. The braking system may be an ABS braking system, which means that it has an arrangement to set the braking force variable independently from a braking force variable predefined by the driver.

The exemplary embodiments and/or exemplary methods of the present invention also relate to an appropriate braking system of a vehicle, in particular for implementing the method according to the preceding explanation and/or using a control unit having a configuration as described above.

The exemplary embodiments and/or exemplary methods of the present invention are elucidated below in greater detail with reference to the exemplary embodiments illustrated in the drawing, without being limited thereto.

DETAILED DESCRIPTION

Figure 1:
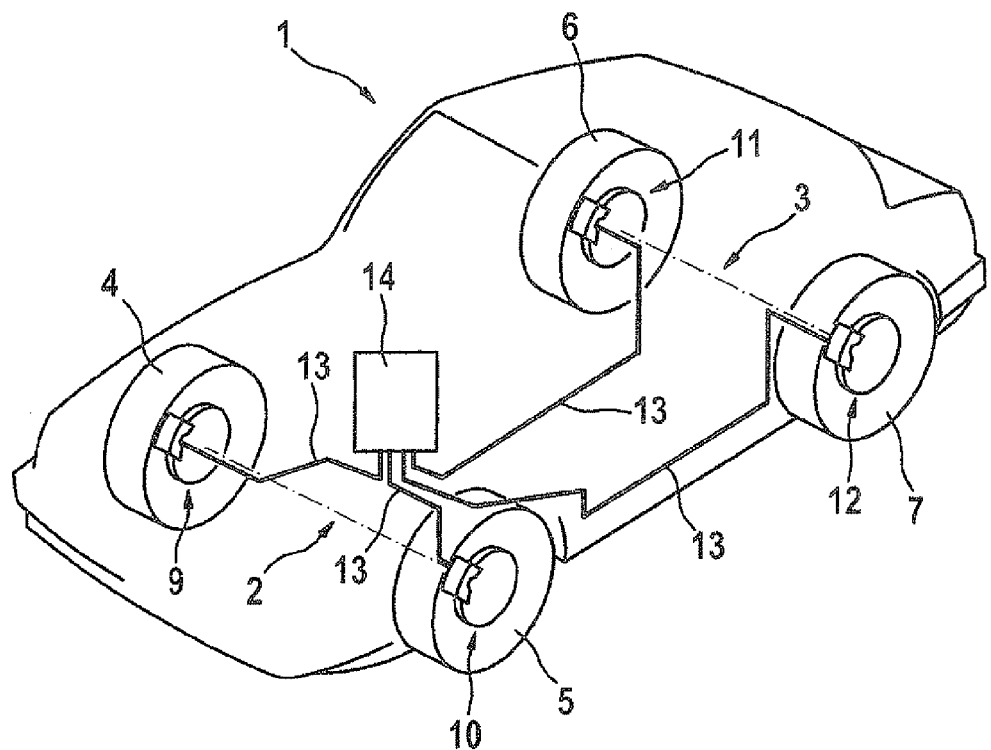
FIG. 1 shows a schematic view of a vehicle.

FIG. 1 shows a schematic view of a vehicle 1. The vehicle has two axles 2 and 3, each of axles 2 and 3 having wheels 4 and 5 and 6 and 7, respectively. Vehicle 1 has a braking system 8 which includes braking devices 9, 10, 11, and 12, each associated with wheels 4, 5, 6, and 7, respectively. These wheels are connected to a control and/or regulating unit 14 via lines 13. Control and regulating unit 14 may apply a braking force variable, which represents a braking force, to each of wheels 4 through 7, a brake pressure p being built up for this purpose in each of braking devices 9 through 12.

Figure 2:
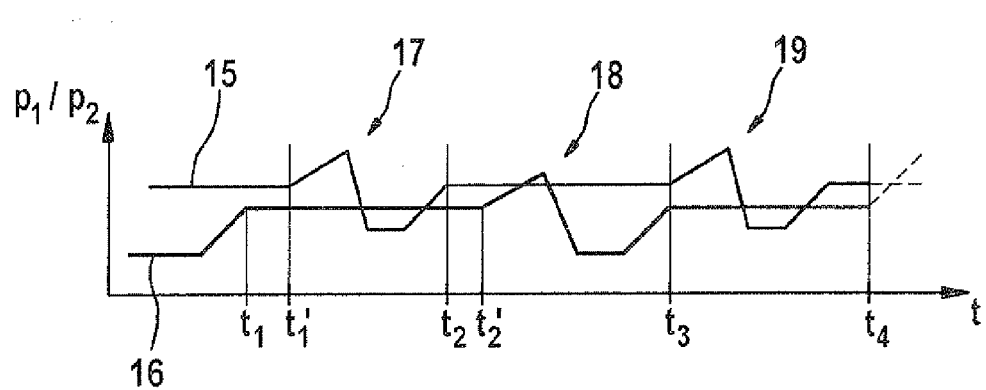
FIG. 2 shows a diagram in which brake pressures $p_1$ and $p_2$ of the two wheels of a vehicle axle are plotted against time t.

FIG. 2 shows a diagram in which brake pressures $p_1$ and $p_2$ are plotted against time t. Brake pressures $p_1$ and $p_2$ are associated with wheels 4 and 5 of axle 2, by way of example. A first curve 15 shows brake pressure $p_1$ of wheel 4 of a vehicle 1. Accordingly, a second curve 2 shows brake pressure $p_2$ of wheel 6 of vehicle 1, both wheels 4 and 5 being provided on common axle 2 and being brake-able by their respective braking devices 9 and 10 associated with them. If a braking operation of vehicle 1 is initiated by a driver of vehicle 1, for example, it is provided to increase the braking force variable of each wheel 4 or 5 (or 4, 5, 6, or 7) until a locking tendency of the particular wheel 4 or 5 is recognized and to subsequently reduce it to a certain value. Subsequently, the braking force variable of each wheel 4 or 5 is to be set to a setpoint braking force variable, which corresponds to a selectable portion of the braking force variable present at the recognition of the locking tendency. This setting takes place for a certain time period. The phase in which the increase and reduction of the braking force variable take place is referred to as a calibration phase and the phase in which the braking force variable is set to the setpoint braking force variable is referred to as a holding phase.

Three time periods 17, 18, and 19 are apparent from the diagram in the figure, time period 17 representing $t_1 \leq t < t_2$, time period 18 representing $t_2 \leq t < t_3$, and time period 19 representing $t_3 \leq t < t_4$. During time period 17, wheel 4 (first curve 15) is noticeably in the calibration phase, and wheel 5 (second curve 16) in the holding phase. This also applies to time period 19; during time period 18, however, wheel 4 is in the holding phase and wheel 5 is in the calibration phase. Brake pressures $p_1$ and $p_2$ illustrated here directly correspond to the braking force variable of the particular wheel 4 or 5. The brake pressure or the braking force variable is set in a controlling and/or regulating manner at braking device 9 or 10 associated with wheel 4 or 5, respectively. It is apparent during time period 17 that the calibration phase of wheel 4 is time-delayed, namely is initiated at a point in time $t'_1 > t_1$ at which wheel 5 is already in the calibration phase, which starts at $t_1$.

The brake pressure is initially increased during the calibration phase until the locking tendency of wheel 4 is determined. Subsequently, it is reduced to the certain value. It should be noted that the values illustrated in the diagram are only examples and that their relationships relative to one another do not allow any conclusion to be drawn about the actual brake pressure or the actual braking force variable. During the calibration phase, the brake pressure, at which the locking tendency of wheel 4 is recognized, is stored and the setpoint braking force variable is subsequently determined, taking into account one selectable portion. This setpoint braking force variable is set for the one wheel in the subsequent holding phase (time period 18).

During time period 18, the calibration phase of wheel 5 starts in a similarly time-delayed manner, namely at a point in time $t'_2 > t_2$. At the same time, wheel 4 is in the holding phase, i.e., the braking force variable or the brake pressure corresponds to the setpoint braking force variable. Time periods 17, 18, and 19 each correspond to the certain time periods for which the setpoint braking force variable is set in a controlling and/or regulating manner at braking device 9 or 10. However, this does not mean that the time period, as illustrated in the diagram of the figure, must have a constant length or duration. It is indeed provided to select the time period variably, e.g., on the basis of influencing variables such as operating state or driving state of vehicle 1, temperature, setpoint braking force variable and the like.

During time period 19, a slightly different succession is provided; here, the calibration phase of wheel 4 starts simultaneously with the holding phase of wheel 5, i.e., directly after the setpoint braking force variable has been set for wheel 5.

It may be selected over the length of the certain time period and the selectable portion, with the aid of which the setpoint braking force variable is determined, whether particular wheel 4, 5, 6, or 7 should be used for increasing the lateral cornering force and/or for optimizing the braking power of vehicle 1. The determination of the reference rotational speed or the reference velocity of vehicle 1 may also be supported. The latter may be determined the more precisely, the longer the certain time period is in which it may be assumed that wheel 4, 5, 6, or 7 does not show a locking tendency. Vehicle 1 or braking system 8 may thus be set in such a way that it may perfectly follow a steering or braking intention of the driver of vehicle 1. Here, a targeted optimization of the described parameters may take place, for which reason an adaptive algorithm may be used, for example. It may be provided that a driver assistance device (for example an ESP or TCS system) may, for example, ascertain in an anticipatory manner whether an increase in the lateral cornering force or an optimization of the braking power of vehicle 1 is necessary. The selectable portion and the certain time period may be set or selected accordingly. With the aid of the adaptive algorithm, it is also possible that braking system 8 is set automatically or adaptively to the requirements of the driver of vehicle 1.

What is claimed is:

1. A method for operating a braking system of a vehicle, having at least one brake-able wheel, the method comprising:
   increasing, by a control device of the vehicle, a braking force variable, wherein the braking force variable represents a braking force applied by a braking device to a first wheel of the at least one brake-able wheel during a braking operation, and wherein the braking force variable is increased until a locking tendency of the first wheel is detected;
   responsive to the detection of the locking tendency of the first wheel, reducing, by the control device, the braking force variable until the locking tendency of the first wheel is one of reduced and no longer detected, wherein a time period between the increasing and the reducing corresponds to a calibration phase of the first wheel; and
   after the reducing of the braking force variable is complete, setting the braking force variable to a setpoint braking force variable, wherein the setpoint braking force variable is set to a value no greater than a value of the braking force variable present when the locking tendency was detected, and wherein the setpoint braking force variable is set for a time period corresponding to a holding phase of the first wheel, a duration of the holding phase being specified by the control unit.

2. The method of claim 1, wherein the vehicle has at least two brake-able wheels, which are provided on a common axle.

3. The method of claim 1, wherein the vehicle includes a second brake-able wheel, the method further comprising:
   applying, by the control unit, a separate calibration phase and a separate holding phase to the second wheel, wherein the calibration phase of the first wheel occurs during the holding phase of the second wheel.

4. The method of claim 1, wherein the increase and reduction of the braking force variable for the first wheel starts with a time-delay or directly after the setpoint braking force variable has been set for the other wheel.

5. The method of claim 1, wherein the increase and reduction of the braking force variable are carried out for the first wheel when a time period specified for the calibration phase is exceeded and/or the locking tendency is determined and/or an appropriate request for changing the braking force exists.

6. The method of claim 1, wherein the vehicle includes a second brake-able wheel, and wherein the locking tendency is detected based on a reference rotational speed which corresponds to the average rotational speed of the first wheel and/or the second wheel.

7. The method of claim 1, wherein the setpoint braking force variable is selected in the range of 10% to 100% of the value of the braking force variable present when the locking tendency was detected.

8. The method of claim 1, wherein the setpoint braking force variable is increased when it is determined during an increase of the braking force variable following the setting of the setpoint braking force variable that the distance between the setpoint braking force variable and the braking force variable, at which the locking tendency is detected, exceeds a predefined maximum value and/or that the setpoint braking force variable is reduced when the distance is below a predefined minimum value, wherein the maximum value is greater than the minimum value.

9. The method of claim 1, wherein the duration of the holding phase is selected according to a desired lateral cornering force of the vehicle and/or is selected to be smaller in the case of a reduced locking tendency.

10. The method of claim 1, wherein the setpoint braking force variable is selected in the range of 25% to 75% of the value of the braking force variable present when the locking tendency was detected.

11. The method of claim 1, wherein the setpoint braking force variable is selected in the range of 25% to 50% of the value of the braking force variable present when the locking tendency was detected.

12. A control unit of a braking system of a vehicle, the braking system having at least one brake-able wheel, comprising:
- a control arrangement that performs the following:
    - increasing a braking force variable, wherein the braking force variable represents a braking force applied by a braking device to a first wheel of the at least one brake-able wheel during a braking operation, and wherein the braking force variable is increased until a locking tendency of the first wheel is detected;
    - responsive to the detection of the locking tendency of the first wheel, reducing the braking force variable until the locking tendency of the first wheel is one of reduced and no longer detected, wherein a time period between the increasing and the reducing corresponds to a calibration phase of the first wheel;
    - after the reducing of the braking force variable is complete, setting the braking force variable to a setpoint braking force variable, wherein the setpoint braking force variable is set to a value no greater than a value of the braking force variable present when the locking tendency was detected, and wherein the setpoint braking force variable is set for a time period corresponding to a holding phase of the first wheel, a duration of the holding phase being specified by the control unit.

* * * * *